Jan. 8, 1957 H. E. STEARNS Re. 24,264

SIDE OUTLETS FOR ABOVE-GROUND IRRIGATION PIPES

Original Filed May 16, 1950

INVENTOR.
HOWARD E. STEARNS
BY
ATTORNEY

United States Patent Office

Re. 24,264
Reissued Jan. 8, 1957

24,264

SIDE OUTLETS FOR ABOVE-GROUND IRRIGATION PIPES

Howard E. Stearns, Grand Island, Nebr.

Original No. 2,647,539, dated August 4, 1953, Serial No. 162,328, May 16, 1950. Application for reissue May 4, 1955, Serial No. 506,102

12 Claims. (Cl. 251—145)

Matter enclosed in heavy brackets [ ] appears in the original patent but forms no part of this reissue specification; matter printed in italics indicates the additions made by reissue.

This invention relates to a controlled side outlet for above-ground irrigation pipes. Many modern irrigation systems employ thin walled pipe lines lying on the ground in the place of irrigation ditches. Formerly, when it was desired to discharge water from an irrigation ditch into a lateral ditch, it was only necessary to cut a notch in the ditch bank, which could be filled with earth when the flow was no longer desired. With the use of above-ground pipes, however, it has been exceedingly difficult to form controlled side outlets wherever and whenever desired without disturbing the pipe.

The principal object of this invention is to provide a simple, positively acting control device which can be quickly and easily installed in an opening cut in the side of the pipe without disturbing the ppe installation in any way and which will act to absolutely seal the pipe when the side outlet is no longer desired.

A further object is to provide a device of this character which can, if necessary, be installed in an irrigation pipe without shutting off the water in the pipe.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

Figure 1:
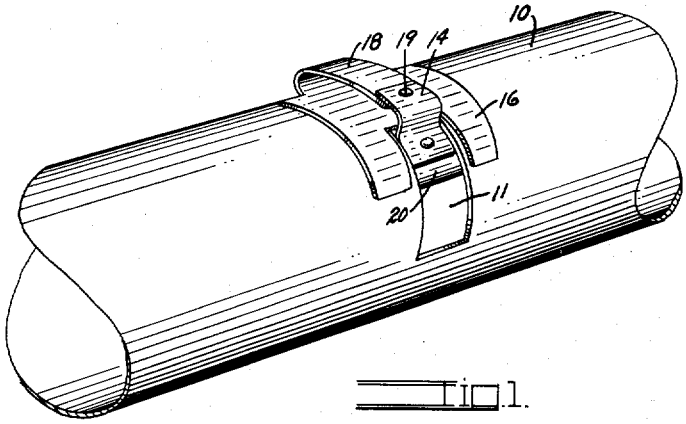
Fig. 1 is a perspective view illustrating the improved side outlet control device in place on a section of irrigation pipe.
Figure 2:
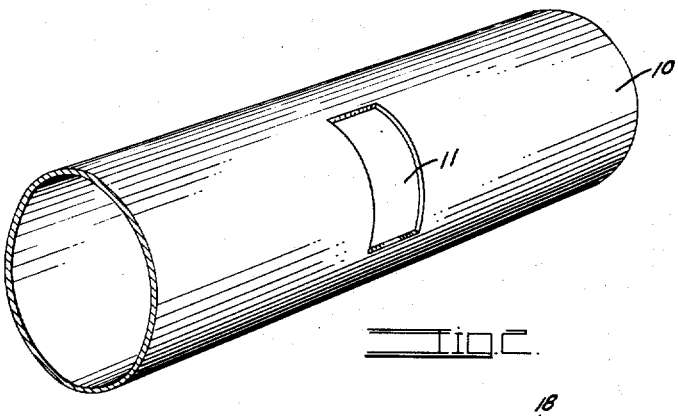
Fig. 2 is a similar view illustrating the type of opening which is made in the pipe to receive the control device.
Figure 3:
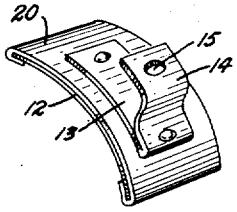
Fig. 3 is a perspective view illustrating that portion of the control device which is placed on the inside of the pipe.
Figure 4:
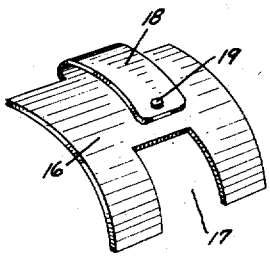
Fig. 4 is a similar view illustrating the portion which is placed on the outside of the pipe.

A typical thin walled, above-ground, irrigation pipe is illustrated at 10. To install the device, a rectangular circumferentially elongated, opening 11 is cut into the side of the pipe 10. This opening can be hacksawed into the pipe wall without shutting off the water in the pipe, if such a procedure is necessary. It is, of course, more satisfactory to have the pipe empty at this time.

An arcuately bent substantially rectangular inner pad 12 is turned on its side and inserted through the opening 11 thence turned to a position parallel with the pipe wall and pulled outwardly so as to seal the opening from the inside. The pad 12 has a length and width sufficient to overlap both the sides and the ends of the opening 11. The width of the pad, however, is less than the length of said opening so that the pad may be passed through the opening by turning the width of the pad parallel to the length of the opening.

A clip strip 13 is riveted or otherwise secured to the inner pad 12 and extends longitudinally thereof to act as a guide in the opening 11 to prevent the pad from rotating relative thereto. The end of the clip strip 13 is turned back upon itself in spaced relation to the major portion of the strip to form a hook-shaped attachment clip 14. An opening 15 is formed in the clip 14 adjacent its free extremity. The attachment clip 14 forms a handle for pulling the pad 12 against the inside of the pipe and holding it thereagainst.

An outer pad 16 is arcuately bent to conform to the external circumference of the pipe 10. The lower edge of the outer pad is notched as shown at 17, the width of the notch exceeding the width of the opening 11. The mid-portion of the upper edge of the outer pad 16 is extended outwardly and bent back over the pad to form a resilient locking tongue 18. A pin 19 is fixed in and projects outwardly from adjacent the extremity of the tongue 18.

The outer pad 17 is placed against the pipe, above the opening 11, and then slid downwardly over the inner pad 12. The tongue 18 is depressed so that it will pass beneath the clip 14 until the pin 19 snaps outwardly in the opening 15 to lock the entire device together as a unit. It can be seen that the inherent resiliency of the tongue 18 will act to pull the inner pad outwardly and the outer pad inwardly so as to seal both pads about the opening 11.

The united pads provide a slide valve which can be slid [circumferentially along] *lengthwise of* the opening 11 to control or stop the flow therethrough. It is preferred to cover the outer[-]surface of the inner pad with a layer of sheet gasket material 20 to more effectively seal the inner pad to the edges of the opening 11.

While a specific form of the improvement has been described and illustrated herein, it is to be understood that the same may be varied, within the scope of the appended claims, without departing from the spirit of the invention.

Having thus described the invention, what is claimed and desired [to secure] by Letters Patent is:

1. Means for controlling the flow through a circumferential elongated opening formed in the wall of thin walled pipe comprising: a relatively thin inner arcuate member curved to conform to the inner diameter of said pipe, said member having a length and width respectively exceeding the length and width of said opening and having a less width than the length of said opening so that it may be passed through the opening and brought to rest against the inside of said pipe about said opening; an arcuate outer member arranged to rest against the outside of said pipe about said opening; and means attaching said outer member to said inner member through said opening so that both members may be moved as a unit to regulate the size of said opening, said attaching means being positioned to alternately contact the [circumferential] extremities of said opening to limit the amount of movement of said members.

2. A side outlet for thin walled irrigation pipe comprising: a circumferentially elongated flow opening in the wall of said pipe; an arcuate inner pad of greater length and width than said opening and having a less width than the length of said opening so that it may be passed through the opening and brought to rest against the inner surface of said pipe about said opening; an arcuate outer pad adapted to rest on the outer surface of said pipe adjacent said opening; and resilient means extending between said pads through said opening and urging the latter against their respective surfaces to seal said opening, said pads and said resilient means being movable longitudinally of said opening to control the flow therethrough.

3. A valve structure for controlling the flow through an elongated side opening in thin walled irrigation pipe comprising: an arcuate inner pad of greater length and width than said opening and adapted to fit against the inner surface of said pipe about said opening; an arcuate outer pad adapted to rest on the outer surface of said pipe adjacent said opening; an attachment clip projecting outwardly from said inner pad through said opening; and a resilient member on said outer pad engaging said clip and acting to urge said inner pad resiliently outward, said pads being simultaneously movable longitudinally of said opening to control the flow through the latter.

4. A valve structure for controlling the flow through an elongated side opening in thin walled irrigation pipe comprising: an arcuate inner pad of greater length and width than said opening and adapted to fit against the inner surface of said pipe about said opening; an arcuate outer pad adapted to rest on the outer surface of said pipe adjacent said opening; [a] *an* [hooked-shaped] attachment clip secured to said inner pad and extending outwardly through said opening; an outer pad resting against the outer surface of said pipe about said opening; and an outwardly-acting resilient tongue formed on said outer pad and engaging beneath said [hooked-shaped] clip so as to urge said inner pad outwardly, said pads being slidable on said pipe to regulate the size of said opening.

5. A valve structure for controlling the flow through an elongated side opening in thin walled irrigation pipe comprising: an arcuate inner pad of greater length and width than said opening and adapted to fit against the inner surface of said pipe about said opening; an arcuate outer pad adapted to rest on the outer surface of said pipe adjacent said opening; [a] *an* [hooked-shaped] attachment clip secured to said inner pad and extending outwardly through said opening; an outer pad resting against the outer surface of said pipe about said opening; [and] an outwardly-acting resilient tongue formed on said outer pad and engaging beneath said [hooked-shaped] clip so as to urge said inner pad outwardly; and an attachment pin projecting from said tongue through an opening in said clip to lock said two pads together so that they may be moved as a unit with reference to said opening to control the flow through the latter.

6. A device for installation through a circumferentially elongated side outlet opening in the cylindrical wall of an irrigation pipe for controlling the flow through said opening, comprising: a relatively thin, arcuate inner pad of less width than length and having a greater length and width than said opening so as to be insertable through said opening to the interior of said pipe, and being formed on an arc conforming to the internal diameter of said pipe so that it will contact the inner surface of said pipe completely around said opening to close and seal said opening; a clip strip mounted on said inner pad within said opening and acting against the sides of said opening to prevent movement of said inner pad longitudinally of said pipe, said strip being of less length than said opening to allow circumferential movement of said inner pad to uncover said opening; an outer pad formed on an arc conforming to the external diameter of said pipe and having a greater width and length than said opening and adapted to rest on said pipe externally of the position of said inner pad; a hook-shaped attachment clip secured to said inner pad and extending outwardly through said opening, thence circumferentially over said outer pad in spaced relation to the latter; and a resilient locking tongue formed on said outer pad and engaging beneath said clip and resiliently urging the latter outwardly to cause the wall of said pipe to be gripped between said two pads.

7. A device as defined in claim 6 having[:] a pin affixed to and projecting outwardly from said tongue through an opening in said clip and adapted to detachably lock said clip to said tongue.

8. A device as described in claim 7 in which a notch is formed in one extremity of said outer pad so that said latter extremity may extend on both sides of said clip for substantially the full length of said inner pad.

*9. Means for controlling the flow through an elongated opening formed in the wall of thin walled pipe comprising: a relatively thin inner arcuate member curved to conform to the inner diameter of said pipe, said member having a length and width respectively exceeding the length and width of said opening and having a less width than the length of said opening so that it may be passed through the opening and brought to rest against the inside of said pipe about said opening; an arcuate outer member arranged to rest against the outside of said pipe about said opening; an attachment member rigidly mounted on the convex face of said inner arcuate member and extending outwardly through said opening to form a handle for pulling the inner member against the inside of the pipe and holding it thereagainst; and means on said outer member engaging said attachment member and acting to hold said outer member against the exterior of said pipe.*

*10. Means for controlling the flow through an elongated opening formed in the wall of thin walled pipe as described in claim 9 in which the attachment member is secured in closer proximity to one extremity of said inner member than the other and extends over the mid-portion of said outer member to apply pressure to said mid portion.*

*11. Means for controlling the flow through an elongated opening formed in the wall of thin walled pipe as described in claim 10 in which the outer member is notched so as to pass on both sides of said attachment member.*

*12. Means for controlling the flow through an elongated opening formed in the wall of thin walled pipe as described in claim 11 in which the attachment member has parallel side edges positioned adjacent the side edges of said opening to prevent lateral or rotative movement of said member in said opening.*

References Cited in the file of this patent or the original patent

UNITED STATES PATENTS

| | | |
|---|---|---|
| 607,669 | Underwood | July 19, 1898 |
| 697,358 | Penner | Apr. 8, 1902 |
| 971,458 | McCleary | Sept. 27, 1910 |
| 1,090,264 | Adams | Mar. 17, 1914 |
| 1,195,102 | Schmidt | Aug. 15, 1916 |
| 1,401,097 | Nickolaus | Dec. 20, 1921 |
| 2,091,686 | Neuhausen | Aug. 31, 1937 |
| 2,129,758 | Frey | Sept. 13, 1938 |
| 2,147,849 | Leo | Feb. 21, 1939 |
| 2,152,270 | Nyden | Mar. 28, 1939 |
| 2,215,882 | Maloney | Sept. 24, 1940 |
| 2,684,827 | Hohnstein | July 27, 1954 |

FOREIGN PATENTS

| | | |
|---|---|---|
| 67,562 | Sweden | of 1928 |
| 214,520 | Switzerland | July 16, 1941 |